United States Patent [19]
Arai

[11] Patent Number: 5,623,514
[45] Date of Patent: Apr. 22, 1997

[54] IC CARD-TYPE MODEM AND METHOD FOR COMMUNICATING DATA BY IC CARD-TYPE MODEM

[75] Inventor: Yasuhiro Arai, Kawasaki, Japan

[73] Assignee: Fujitsu Limited, Kawasaki, Japan

[21] Appl. No.: 455,572

[22] Filed: May 31, 1995

[30] Foreign Application Priority Data

Jul. 29, 1994 [JP] Japan ..................................... 6-179338

[51] Int. Cl.$^6$ ............................. H04B 1/38; H04M 7/04
[52] U.S. Cl. .......................................... 375/222; 379/398
[58] Field of Search ........................... 379/398, 30, 394; 375/220, 222

[56] References Cited

U.S. PATENT DOCUMENTS 5,249,225 9/1993 Williams .................................. 379/404

*Primary Examiner*—Stephen Chin
*Assistant Examiner*—Kevin Kim
*Attorney, Agent, or Firm*—Armstrong, Westerman, Hattori, McLeland & Naughton

[57] ABSTRACT

An IC card-type modem comprises a modulation demodulation unit, an impedance conversion unit, an impedance matching unit, and a matching selection unit. The modulation demodulation unit connected to a terminal equipment modulates and demodulates a data stored in the terminal equipment. The impedance conversion unit converts impedances between the modulation demodulation unit and a line. The impedance matching unit has a plurality of impedance matching elements having impedances that differ one another. The matching selection unit selects an impedance matching element which matches the impedance of the modulation demodulation unit to the impedance of the line within the plurality of impedance matching elements, and connects the selected impedance matching element to the impedance conversion unit.

16 Claims, 10 Drawing Sheets

IC CARD-TYPE MODEM AND METHOD FOR COMMUNICATING DATA BY IC CARD-TYPE MODEM

BACKGROUND OF THE INVENTION

The present invention relates to an IC card-type modem which executes a data communication between a terminal equipment and a switch through a telephone line by modulating and demodulating data stored in the terminal equipment, and relates to a method for communicating data by the IC card-type modem.

The data communication has been executed by the modem equipment (a modulator demodulator) up to the present. The modem equipment modulates digital data transmitted from a personal computer into an analog data, and transmits the analog data to the telephone line. Also, the modem equipment demodulates the analog data transmitted from the telephone line into digital data, and transmits the digital data to the personal computer.

Recently, circuit parts have been accommodated within the IC (Integrated Circuit) card so as to plan a miniaturization of the modem equipment. The construction which is in conformity with standards of Japan Electronic Industry Development Association (JEIDA) or Personal Computer Memory Card International Association (PCMCIA) is adopted in the IC card-type modem.

For instance, the size of the IC card-type modem which is in conformity with the standard of JEIDA is 54 mm in width, 85.6 mm in length and 5 mm in thickness. Further, the size of the IC card-type modem is almost the same as the size of the IC card-type modem which is in conformity with the standard of PCMCIA.

However, a height of such large-sized parts as a line transformer connected to the telephone line is more than 5 mm. For this reason, the large-sized parts did not meet the standards. In this case, the line transformer could not be mounted within the IC card, so the line transformer was installed outside of the IC card. However, a charm of the product is deteriorated when the parts are installed outside of the IC card. Accordingly, a small-sized and sheet-type line transformer has been mounted within the IC card by methods of every kind up to the present.

For instance, an effect that the whole modem is thinned to be accommodated in the IC card is mentioned in 268379 number of Patent Disclosure in 1993 which has been already well-known. Besides, the effect that a DC loop-circuit and the line transformer are integrated is mentioned in 327791 number of Patent Disclosure in 1993 and in 268372 number of Patent disclosure in 1993. The DC loop circuit and the line transformer are integrated by a pseudo inductance circuit comprising a transistor, a resistor and a capacitor, and a coupling capacitor.

However, a small-sized and sheet-type line transformer mounted on the IC card could not meet the line standards of each nationality. Namely, the line standard of each nationality is specified in accordance with such actual circumstances as a line impedance in each nationality. Hereupon, one card-type modem can correspond to the standards of each nationality if there is some space in a design margin of the IC card-type modem, when the difference of standard value per nationality is small within each term of the line standards.

However, the difference of the standard value is large concerning a return loss in every nationality. For this reason, one IC card-type modem could not correspond to the return loss standard of every nationality. Hereupon, the return loss means a relative attenuation volume of a signal level reflected to the side of the line, when the pseudo line of every nationality (a line simulator having a standard line characteristic) is connected to the line transformer within the IC card-type modem.

Fundamentally, the line transformer whose impedance is matched to the pseudo line should be designed for every nationality, in order to meet the return loss standard. For this reason, a single IC card-type modem which is in conformity with the line standard of each nationality has been demanded.

Besides, the specification of the switch connected to the IC card-type modem through the telephone line is different in every nationality. For this reason, an input output signal of the modem also had to correspond to the specification of every nationality. The input output signal of the modem is, for instance, a signal indicating a dial tone (a continuous tone when a receiver is picked up) to the switch and a busy tone.

SUMMARY OF THE INVENTION

An object of the present invention is to provide an IC card-type modem which accommodates all circuits of the modem within the IC card, which is in conformity with a line standard of each nationality and is common to each nationality, and a method for communicating data by the IC card-type modem.

The IC card-type modem of the present invention comprises a modulation demodulation unit, an impedance conversion unit, an impedance matching unit and a matching selection unit. The impedance conversion unit converts impedances between the modulation demodulation unit and the line. The impedance matching unit includes a plurality of impedance matching elements having the impedances that differ one another.

The matching selection unit selects an impedance matching element which matches the impedance of the modulation demodulation unit to the impedance of the line selectively out of the plurality of impedance matching elements, and connects the selected impedance matching element to the impedance conversion unit.

Although the IC card-type modem of the present invention consists of the above-mentioned essential components, it will be organized even if the components are concretely as follows.

Each of the plurality of impedance matching elements is provided per nationality so as to match the impedance of the modulation demodulation unit to the impedance of the line which is specified per nationality.

Further, the IC card-type modem comprises a line connector having the matching selection unit, and mounts the matching selection unit on the impedance matching element to be selected detachably and mounting the line on the impedance conversion unit detachably.

The line connector is provided per nationality. The impedance matching unit is connected to the side of the modulation demodulation unit of the impedance conversion unit.

The impedance conversion unit is a line transformer having a primary winding connected to the line and a secondary winding connected to the modulation demodulation unit. The impedance matching unit is connected to the secondary winding of the line transformer. The impedance matching unit is composed of a plurality of resistance elements and a plurality of capacity elements.

Further, the IC card-type modem comprises a calculation unit and a control unit. The calculation unit calculates a value of the selected impedance matching element by measuring a signal value of both edges of the impedance matching element selected by the selection matching unit. The control unit discriminates the nationality of the line connected to the impedance conversion unit on the basis of the value of the impedance matching element calculated by the calculation unit, and changes an input output signal of the line into the input output signal which is corresponding to a specification of the discriminated nationality.

Further, the IC card-type modem is provided with a connection control unit for controlling so as to connect the line to the impedance conversion unit. The calculation unit calculates the value of the selected impedance matching element, when the line is not connected to the impedance conversion unit by the connection control unit.

Further, the IC card-type modem comprises the calculation unit and the control unit. The calculation unit calculates the value of the selected impedance matching element by measuring the signal value of both edges of the selected impedance matching element, when the matching selection unit of the line connector is connected to the impedance matching element to be selected. The control unit discriminates the nationality of the line connected to the line connector on the basis of the value calculated by the calculation unit, and changes the input output signal of the line into the input output signal corresponding to the specification of the discriminated nationality.

Further, the IC card-type modem is provided with a connection control unit for controlling so as to connect the line connector to the impedance conversion unit. The calculation unit calculates the value of the selected impedance matching element, when the line connector is not connected to the impedance conversion unit by the connection control unit.

A method for communicating data by the IC card-type modem of the present invention comprises a modulation demodulation step, a conversion step, a selection step and a matching step. The modulation demodulation step modulates and demodulates the data stored in the terminal equipment by the modulation demodulation unit. The conversion step converts an impedance between the modulation demodulation unit and the line. The selection step selects a plurality of impedance matching elements having the impedances which differ one another selectively. The matching step matches the impedance of the modulation demodulation unit to the impedance of the line by the selected impedance matching element.

Further, the method for communicating data by the IC card-type modem of the present invention also can be organized by changing the order of the steps according to circumstances.

Although the method for communicating data by the IC card-type modem consists of the above-mentioned essential components, it will be organized even if the components are concretely as follows.

The each impedance matching element is provided per nationality so as to match the impedance of the modulation demodulation unit to the impedance of the line which is specified per nationality.

Further, the method for communicating data by the IC card-type modem comprises a calculation step and a control step. The calculation step calculates a value of the selected impedance; matching element by measuring a signal value of both edges of the selected impedance matching element. The control step discriminates the nationality of the circuit on the basis of the calculated value, and changes the input output signal of the line into the input output signal corresponding to the specification of the discriminated nationality.

Further, the calculation step calculates the value of the selected impedance matching element, when the side of the circuit is opened.

According to the IC card-type modem of the present invention, the modulation demodulation unit connected to the terminal equipment modulates and demodulates the data stored in the terminal equipment, and the impedance conversion unit converts the impedances between the modulation demodulation unit and the line.

At this moment, the matching selection unit selects the impedance matching element which matches the impedance of the modulation demodulation unit to the impedance of the line selectively out of the plurality of impedance matching elements, and connects the selected impedance matching element to the impedance conversion unit.

Accordingly, all of the circuits are accommodated within one IC card-type modem, and the IC card-type modem which is common to each nationality can make the impedance of the modulation demodulation unit fit for each of the line impedances, even if the plural kinds of impedances of the line exist. Besides, it will be possible to reduce the cost of the product, since the IC card-type modem itself can be designed in common to each nationality.

Also, the impedance of the modulation demodulation unit can be matched to the impedance of the line which is specified per nationality, since each of the impedance matching elements is provided per the nationality.

Further, the impedance of the line can be matched to the impedance of the modulation demodulation unit, only when the matching selection unit in the line connector is installed on the impedance matching element to be selected.

One IC card-type modem can correspond to each nationality, since the line connector is provided per nationality, and the matching selection unit included in the each line connector selects each of the corresponding impedance matching elements.

A synthetic impedance comprising the impedance of the impedance matching unit and the impedance of the modulation demodulation unit can be matched to the impedance of the line, when the impedance matching unit is connected to the side of the modulation demodulation unit of the impedance conversion unit.

Further, the control unit discriminates the nationality of the line connected to the impedance conversion unit, on the basis of the calculated value and changes the input output signal of the line into the input output signal corresponding to the specification of the selected nationality, when the calculation unit calculates a value of the selected impedance matching element by measuring a signal value of both sides of the selected impedance matching element. Accordingly, one IC card-type modem can correspond to the specification of the switch of each nationality.

Also, the calculation unit measures the signal value of both edges of the selected impedance matching element, when the line is not connected to the impedance conversion unit, namely, when the side of the line is opened. Accordingly, the signal value can be measured accurately after considering the impedance of the line.

Further, the calculation unit calculates the value of the selected impedance matching element and the control unit changes the input output signal, also when the matching selection unit in the line connector is connected to the impedance matching element to be selected. Accordingly, one IC card-type modem can correspond to the specification of the switch of each nationality.

The signal value can be measured accurately after considering the impedance of the line, since the calculation unit measures the signal value of both edges of the selected impedance matching element, when the line connector is not connected to the impedance conversion unit.

DETAILED DESCRIPTION OF THE PREFERRED EMBODIMENT

Figure 1:
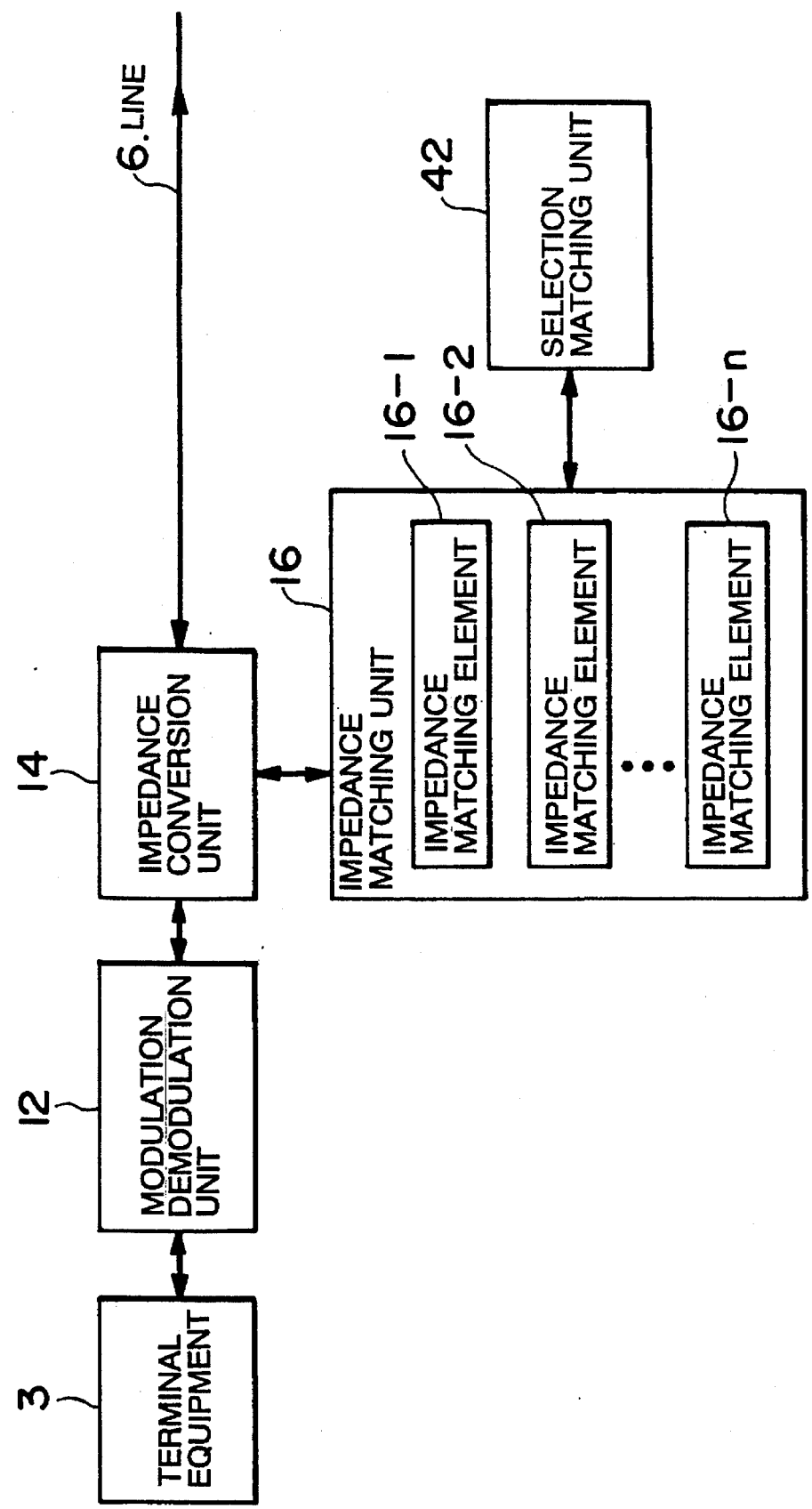
FIG. 1 is a construction diagram indicating an IC card-type modem according to the embodiment 1 of the present invention.

The embodiments of an IC card-type modem and a method for communicating data by the IC card-type modem of the present invention will be described by referring to the drawings as follows.

EMBODIMENT 1

FIG. 1 is a construction diagram indicating the IC card-type modem according to the embodiment 1 of the present invention. The IC card-type modem of the present invention comprises a modulation demodulation unit 12, an impedance conversion unit 14, an impedance matching unit 16 and a matching selection unit 42.

The modulation demodulation unit 12 is connected to a terminal equipment 3, and modulates and demodulates the data stored in the terminal equipment 3. The modulation demodulation unit 12 converts (modulates) a digital data transmitted from the terminal equipment 3 into an analog data transmitted to a line 6, and converts (demodulates) the analog data transmitted from the line 6 into the digital data transmitted to the terminal equipment 3.

The impedance conversion unit 14 is connected to the modulation demodulation unit 12 and the line 6. The impedance conversion unit 14 converts impedances between the modulation demodulation unit 12 and the line 6. The impedance conversion unit 14 is, for instance, a small-sized and sheet-type line transformer which is formed so as to be mounted on the IC card.

The impedance matching unit 16 is connected to the impedance conversion unit 14, and has a plurality of impedance matching elements 16-1-16-n having impedances which differ from one another. The impedance matching unit 16 is composed of passive elements and so The matching selection unit 42 is connected to the impedance matching unit 16. The matching selection unit 42 selects an impedance matching element which matches the impedance of the modulation demodulation unit to the impedance of the line selectively out of the plurality of impedance elements 16-1-16-n, and connects the selected impedance matching element to the impedance conversion unit 14. The matching selection unit 42 is, for instance, a line connector having a connection line connected to the impedance matching element to be selected and so on.

In the embodiment 1, all of the circuits of the modem are mounted within the IC card and the modem is made fit for the line standard which is specified per nationality.

Figure 2:
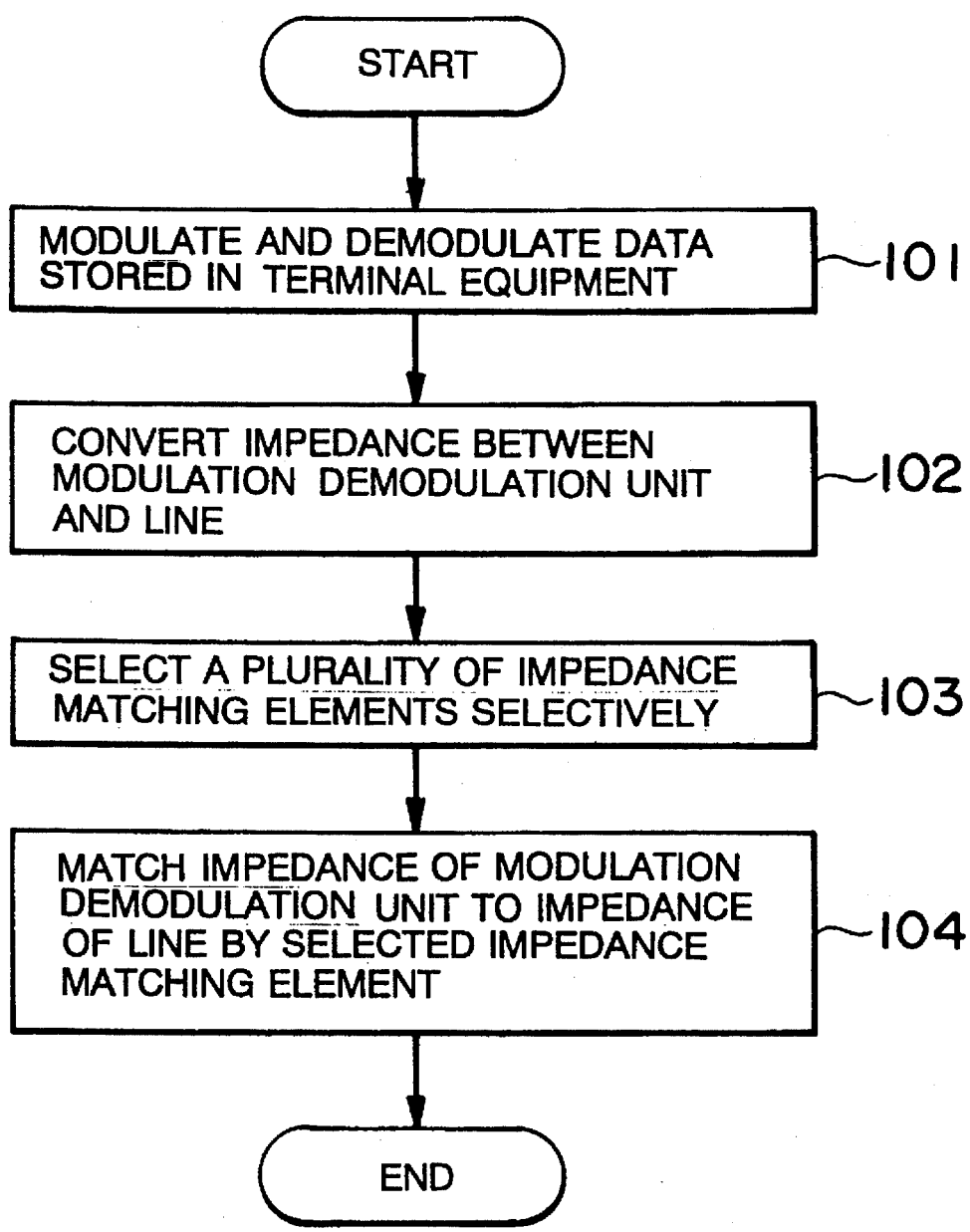
FIG. 2 is a flowchart indicating a method for communicating data by the IC card-type modem according to the embodiment 1 of the present invention.

Then, the method for communicating data by the IC card-type modem of the embodiment 1 will be described by referring to FIG. 2.

First of all, the modulation demodulation unit 12 connected to the terminal equipment 3 modulates and demodulates the data stored in the terminal equipment 3 (Step 101). Then, the impedance conversion unit 14 converts impedances between the modulation demodulation unit 12 and the line 6 (Step 102).

At this moment, the matching selection unit 42 selects an impedance matching element which matches the impedance of the modulation demodulation unit 12 to the impedance of the line 6 selectively out of the plurality of impedance matching elements 16-1-16-n (Step 103). Then, the matching selection unit 42 connects the selected impedance matching element to the impedance conversion unit 14. Namely, the impedance of the modulation demodulation unit 12 is matched to the impedance of the line 6 by the selected impedance matching element (Step 104).

Accordingly, all of the circuits are accommodated within one IC card-type modem, and the IC card-type modem which is common to each nationality can make the impedance of the modulation demodulation unit 12 fit for the impedance of each line 6, even if the plural kinds of impedances of the line 6 exist.

EMBODIMENT 2

Figure 3:
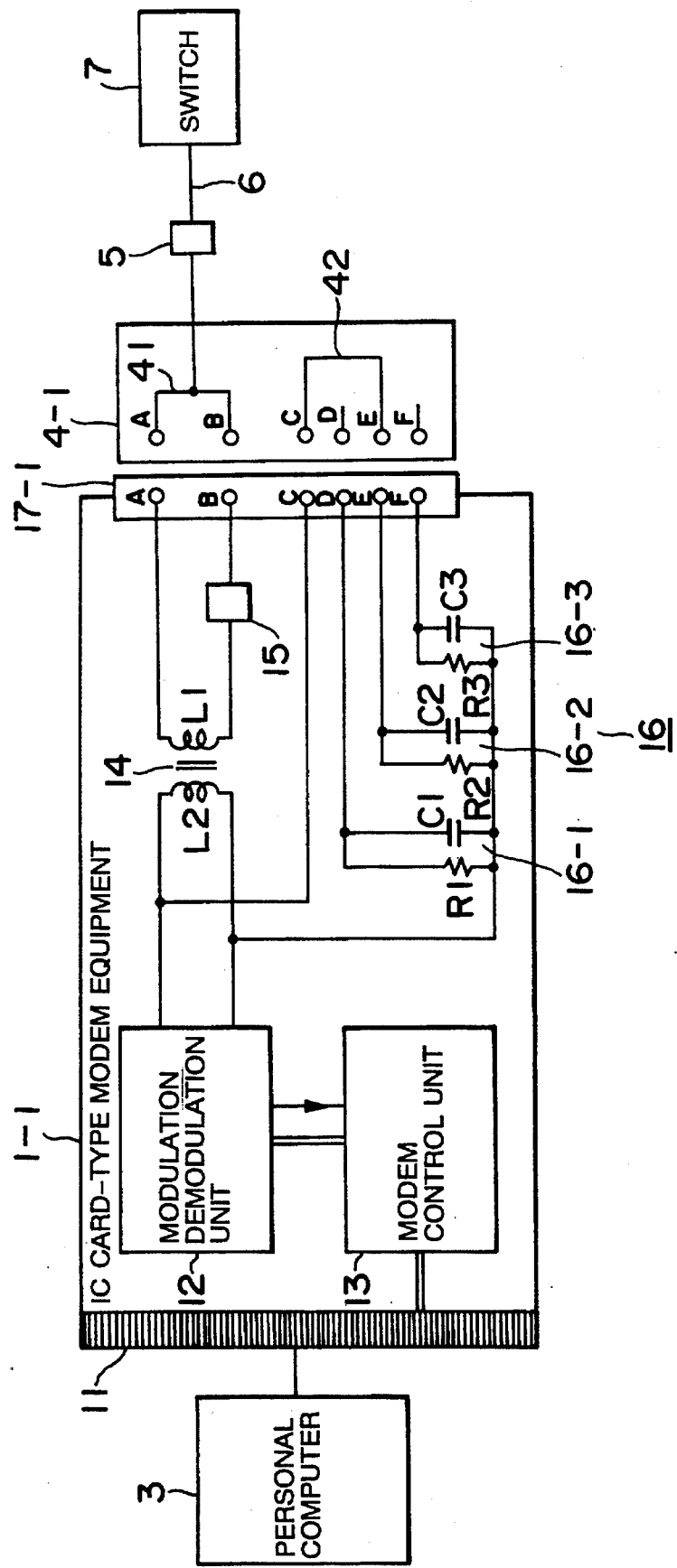
FIG. 3 is a construction diagram indicating an IC card-type modem according to the embodiment 2 of the present invention.

The embodiment 2 of the IC card-type modem of the present invention will be described. FIG. 3 is a construction diagram of the IC card-type modem according to the embodiment 2 of the present invention.

A connector 11 standardized by Japan Electronic Industry Development Association (JEIDA) or Personal Computer Memory Card International Association (PCMCIA) is installed on one side of the IC card-type modem equipment (referred to as modem equipment hereinafter) 1—1. A personal computer 3 is connected to the modem equipment 1—1 through the connector 11. The modem equipment 1—1 modulates and demodulates the data stored in the personal computer 3.

Also, a connector 17-1 is installed on the other side of the modem equipment 1—1. A line connector 4-1 can be connected to the modem equipment 1—1 detachably. A telephone line 6 is connected to the line connector 4-1 through a modular plug 5. A switch 7 is connected to the telephone line 6.

The modem equipment 1—1 modulates a digital data transmitted from the personal computer 3 into an analog data, and transmits the analog data to the telephone line 6 through the line connector 4-1.

The modem equipment 1—1 demodulates the analog data transmitted from the telephone line 6 through the line connector 4-1 into the digital data, and transmits the digital data to the personal computer 3.

The modem equipment 1—1 comprises the connector 11, the modulation demodulation unit 12 consisting of Large Scale Integrated circuits (LSI), a modem control unit 13 consisting of LSIs connected to the modulation demodulation unit 12, a line transformer 14, a photo MOS relay 15 and an impedance matching unit 16.

The photo MOS relay 15 is connected to a primary winding L1 and a connector 17-1. The line transformer 14 is composed of the small-sized and sheet-type transformers and comprises a primary winding L1 connected to the connector 17-1 and a secondary winding L2 connected to the modulation demodulation unit 12. The line transformer 14 converts the impedance between the telephone line 6 and the modulation demodulation unit 12 by the primary winding L1 and the secondary winding L2.

Further, the line transformer can be provided with a pseudo inductance circuit and a coupling capacitor which connects the pseudo inductance circuit to the connector 17-1 so as to be integrated. The pseudo inductance circuit comprises such active elements as a transistor and a passive element consisting of a resistor and a condenser.

The line transformer 14 by the pseudo inductance circuit and the coupling capacitor has been already mentioned in 327791 number of Patent Disclosure in 1993 and in 268372 number of Patent Disclosure in 1993.

The impedance matching unit 16 is composed of three impedance matching elements 16-1-16-3 having the impedances which differ from one another.

The each impedance matching element 16-i (i=1-3) is composed of a resistor R (i=1-3) and a capacitor C (i=1-3) connected to the resistor R in parallel. The each impedance matching element 16-i is provided per nationality so as to match the impedance of the modulation demodulation unit 12 to the impedance of the line 6 specified per nationality.

Each of the connector 17-1 and the line connector 4-1 has five terminals A–F. The corresponding terminals are connected to one another, when the connector 17-1 and the line connector 4-1 are connected. The photo MOS relay 15 is installed on the terminal B of the connector 17-1 and on one edge of the primary winding, and is a MOS (Metal Oxide semiconductor) type FET (Field Effect Transistor) which is switch-operated by receiving the light.

One edge of the secondary winding L2 of the line transformer 14 is connected to the C terminal of the connector 17-1. One edge of the impedance matching element 16-1 is connected to the D terminal of the connector 17-1.

One edge of the impedance matching element 16-2 is connected to the E terminal of the connector 17-1. One edge of the impedance matching element 16-3 is connected to the F terminal of the connector 17-1. The other edge of each impedance matching element 16-1-16-3 is connected to the other edge of the secondary winding L2 of the line transformer 14.

The line connector 4-1 has a connection line 41 which connects the terminal A, the terminal B and a modular plug 5, and has a matching selection line 42 which connects the terminal C and the terminal E as a matching selection unit.

The matching selection line 42 selects the impedance matching element 16-2 which matches the impedance of the modulation demodulation unit 12 to the impedance of the line 6 selectively out of three impedance matching elements 16-i, and connects the selected impedance matching element 16-2 to the line transformer 14. The line connector 4-1 is provided per nationality.

The selected impedance matching element of the impedance matching unit 16 is connected to the side of the modulation demodulation unit 12 of the line transformer 14, namely, to the secondary winding L2, when the line connector 4-1 is connected to the connector 17-1.

Figure 4:
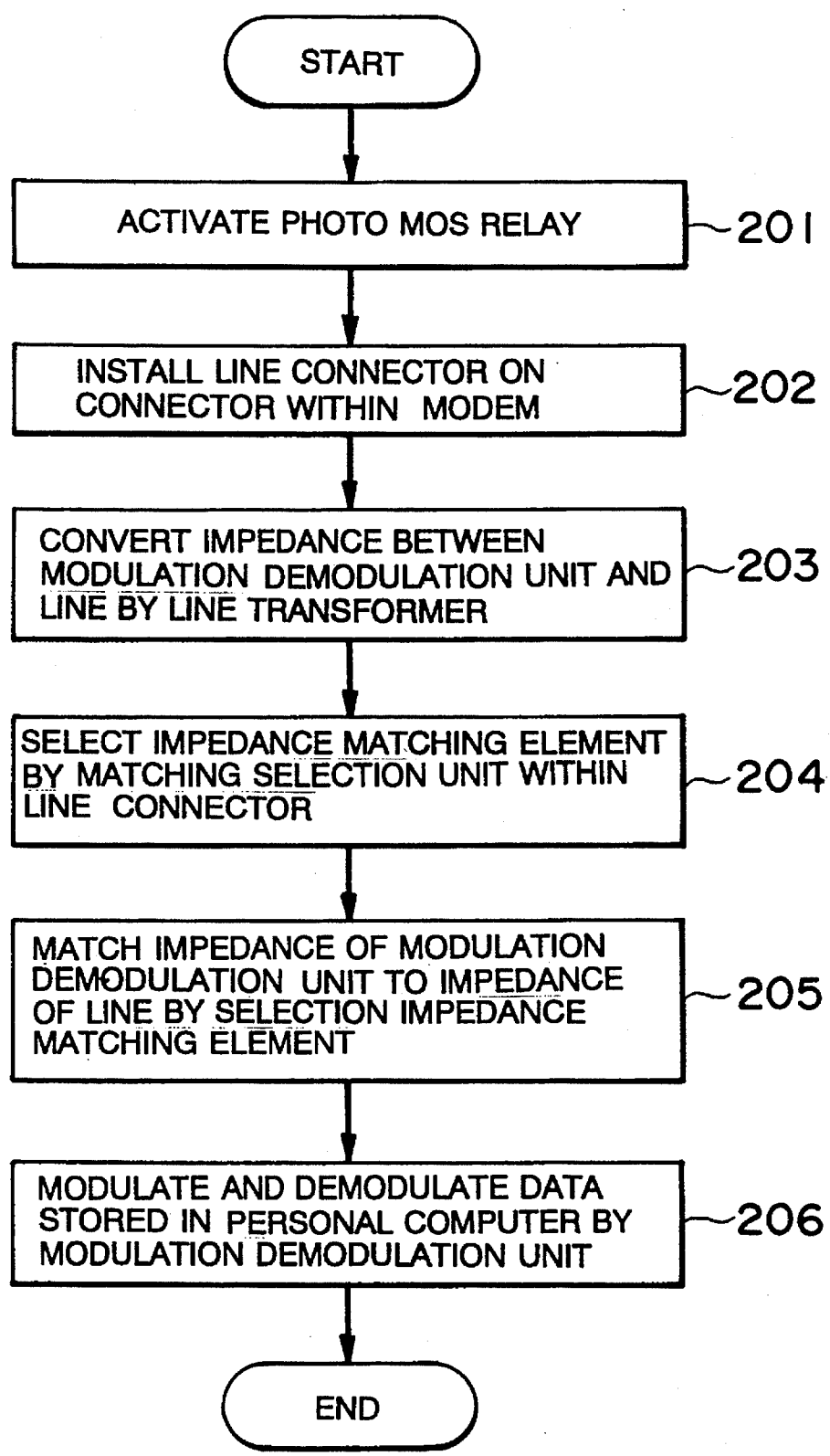
FIG. 4 is a flowchart indicating a method for communicating data by the IC card-type modem according to the embodiment 2 of the present invention.

FIG. 4 is a flowchart indicating a method for communicating data by the IC card-type modem according to the embodiment 2. Then, the method for communicating data by the IC card-type modem according to the embodiment 2 constructed in the above-mentioned way will be described.

First of all, the terminal B is connected to the primary winding L1 of the line transformer 14 by activating the photo MOS relay 15 (Step 201).

Then, the line connector 4-1 is installed on the connector 17-1 (Step 202). The impedances are converted between the modulation demodulation unit 12 and the line 6 by the line transformer 14, when the telephone line 6 is connected to the line transformer 14 through the modular plug 5 by the connection line 41 (Step 203).

Besides, simultaneously with the connection between the connectors, the impedance matching element 16-2 comprising a resistor R2 and a capacitor C2 is selected by the matching selection unit 42. The impedance matching element 16-2 is connected to the both edges of the secondary winding L2 of the line transformer 14 (Step 204).

Then, the impedance of the modulation demodulation unit 12 is matched to the impedance of the line 6 by the selected impedance matching element 16-2 (Step 205). The modulation demodulation unit 12 modulates and demodulates the data stored in the personal computer 3, in a state that matching of the impedance was executed (Step 206).

As mentioned hereinbefore, according to the embodiment 2, the line transformer 14 converts the impedance between the modulation demodulation unit 12 and the line 6. At this moment, the matching selection unit 42 selects the impedance matching element which matches the impedance of the modulation demodulation unit 12 to the impedance of the line 6 selectively out of the plurality of impedance matching elements, and connects the selected impedance matching element to the line transformer 14.

Accordingly, all of the circuits are accumulated within the IC card-type modem equipment, and the impedance of the modem can be made fit for the each line impedance in the IC card modem equipment which is common to every nationality, even if a plural kinds of impedances of the line 6 exist.

Besides, it is possible to reduce the cost of the product, since the modem equipment which is common to every nationality can be designed. Moreover, the impedance of the modulation demodulation unit 12 can be matched to the impedance of the line 6 specified per nationality, since each of the impedance matching elements 16-1-16-3 is provided per nationality.

Further, the order of processes of the modem equipment can be changed so as to connect the line connector 4-1 to the connector 17-1 after modulating and demodulating the data at the start.

Figure 5A:
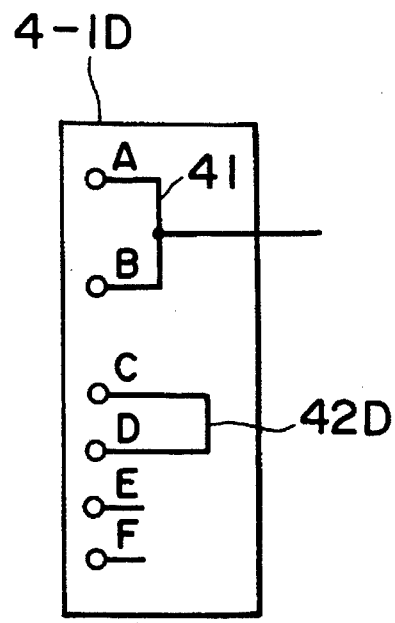
FIG. 5A is a diagram indicating an example 1 of a line connector including a matching selection line.

FIG. 5 is a diagram indicating an example of the line connector. The line connector 4-1D shown in FIG. 5 selects the impedance matching element 16-1 by the matching selection line 42D which connects the terminal C and the terminal D.

Figure 5B:
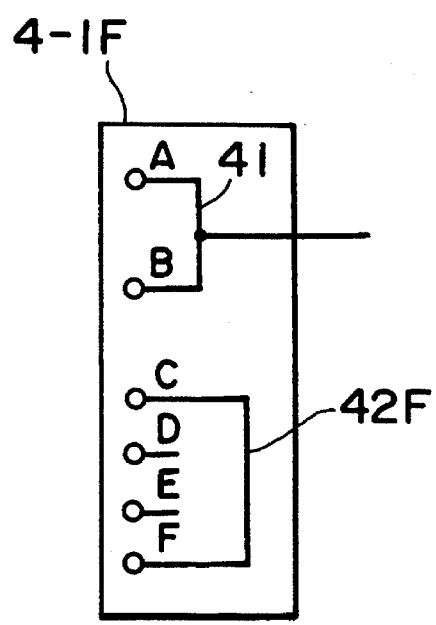
FIG. 5B is a diagram indicating an example 2 of a line connector including a matching selection line.

The line connector 4-1F shown in FIG. 5B selects the impedance matching element 16-3 by the matching selection line 42F which connects the terminal C and the terminal E.

As mentioned hereinbefore, one modem equipment 1—1 can correspond to every nationality, since the line connector is provided according to nationality, and the matching selection line included in each line connector selects each of the corresponding impedance matching elements.

At this moment, the synthetic impedance comprising the impedance of the impedance matching unit 16 and the impedance of the modulation demodulation unit 12 can be matched to the impedance of the line 6 by connecting the impedance matching unit 16 to the secondary winding L2 of the line transformer 14.

Figure 6:
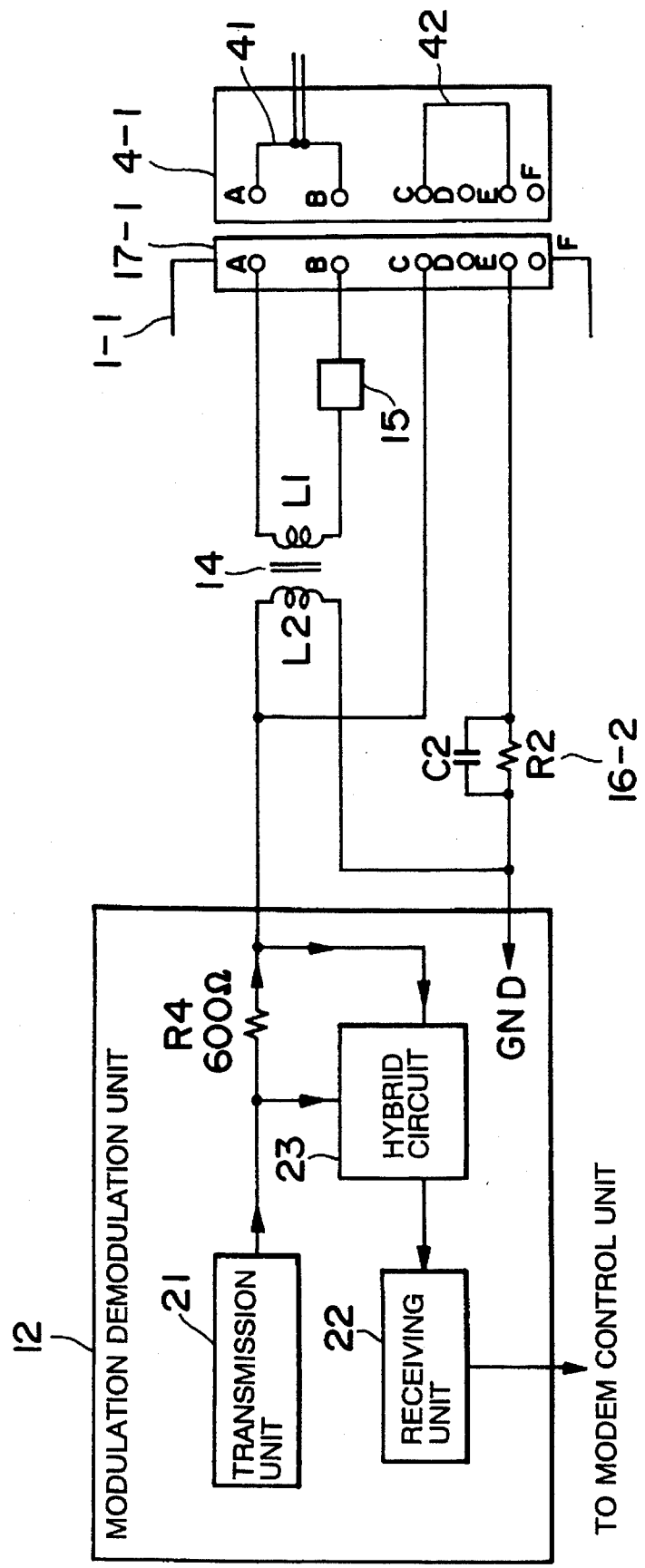
FIG. 6 is a construction diagram indicating a modulation demodulation unit of the embodiment 2 of the present invention.

FIG. 6 is a construction diagram indicating a modulation demodulation unit of the embodiment 2. In FIG. 6, the modulation demodulation unit 12 comprises a transmission unit 21, a resistor R4, a hybrid circuit 23 connected to the both edges of the resistor R4 and a receiving unit 22 connected to the hybrid circuit 23 and the modem control unit 13. One edge of the resistor R4 is connected to the transmission unit 21, and the other edge of the resistor R4 is connected to the line transformer 14. The resistor R4 is, for instance, 600 ohm.

The transmission unit 21 transmits the data through the resistor R4 and the line transformer 14 to the telephone line 6, when the line connector 4-1 is connected to the connector 17-1, and the photo MOS relay 15 is operating.

The hybrid circuit 23 receives the data transmitted from the telephone line 6 through the line transformer 14 and transmits it to the receiving unit 22, when the line connector is connected to the connector 17-1, and the photo MOS relay 15 is operating.

Besides, the hybrid circuit 23 receives a voltage value of both edges of the resistor R4 and transmits it to the receiving unit 22, when the line connector 4-1 is connected to the connector 17-1, and the photo MOS relay 15 is not operating (the side of the line is opened).

The receiving unit 22 calculates a value of the selected impedance matching element by measuring the voltage value of the both edges of the selected impedance matching element 16-2 from the voltage value of the both edges of the resistor R4.

The modem control unit 13 discriminates the nationality of the line 6 connected to the line transformer 14 on the basis of the value calculated in the receiving unit 22, and gives an instruction to the personal computer 3 so as to change the input output signal of the line 6 into the input output signal corresponding to the specification of the discriminated nationality.

Hereupon, the input output signal of the line includes a dial pass to the switch 7, a dial tone from the switch 7, a busy-back tone signal and so on.

Figure 7:
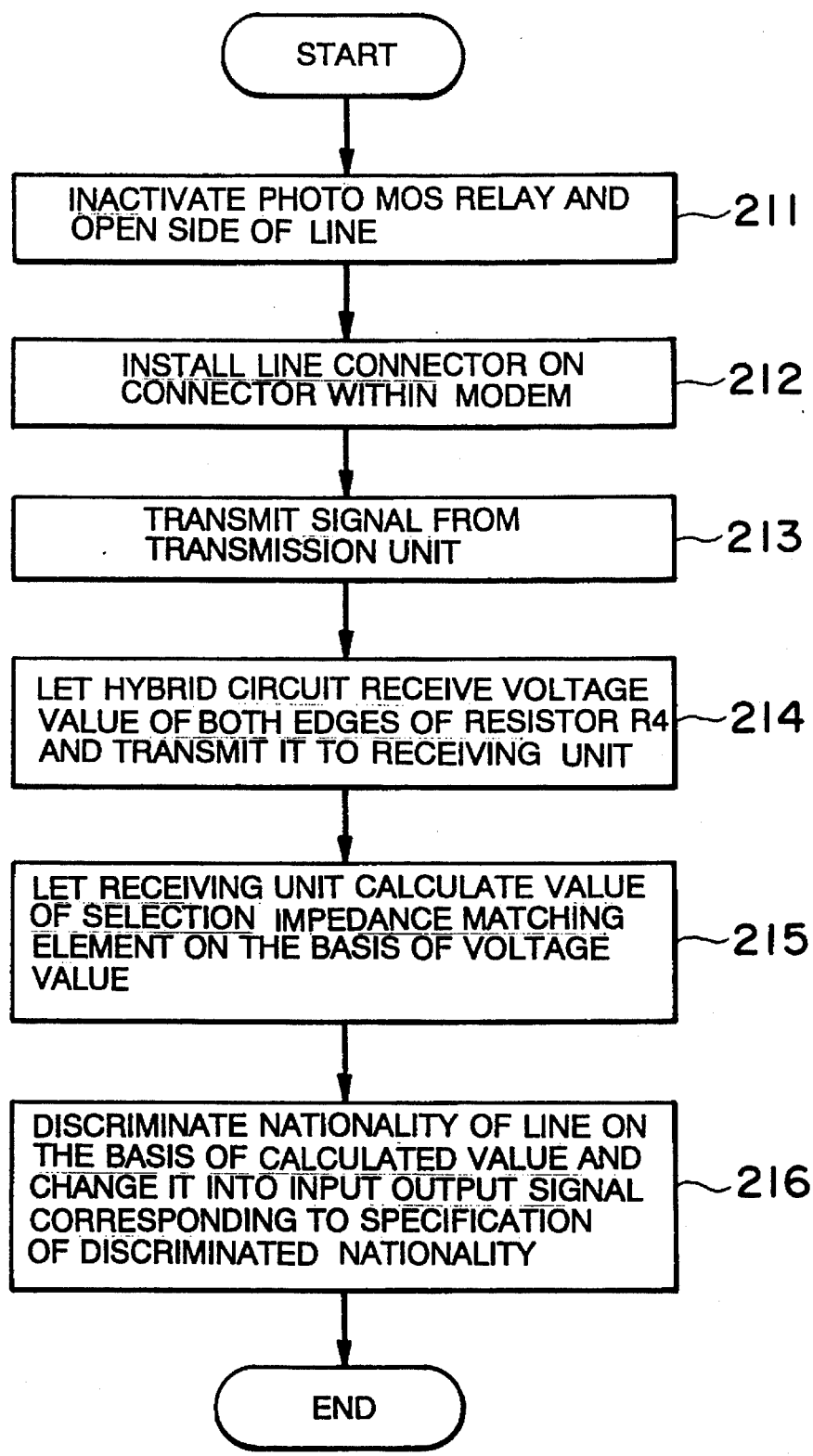
FIG. 7 is a flowchart indicating an operation of a modulation demodulation unit of the embodiment 2 of the present invention.

Then, the operation of the modulation demodulation unit of the embodiment 2 constructed in the above-mentioned way will be descried by following the flowchart shown in FIG. 7. First of all, the side of the telephone line 6 is opened by inactivating the photo MOS relay 15 (Step 211). After that, the line connector 4-1 is connected to the connector 17-1 (Step 212).

Then, the hybrid circuit 23 receives the voltage value of the both edges of the resistor R4 and transmits it to the receiving unit 22 (Step 214), after the transmission unit 21 transmits the signal to the resistor R4 and the line transformer 14 (Step 213).

Then, the receiving unit 22 calculates a value of the selected impedance matching element 16-2 by measuring the voltage value of the both edges of the impedance matching element 16-2 selected from the voltage value of the both edges of the resistor R4 (Step 215).

Moreover, the modem control unit 13 discriminates the nationality of the line 6 connected to the line transformer 14 on the basis of the value calculated in the receiving unit 22. The modem control unit 13 gives the instruction to the personal computer 3 so as to change the input output signal of the line 6 into the input output signal corresponding to the specification of the discriminated nationality (Step 216).

Accordingly, the modem equipment 1-2 can correspond to the specification of the switch 7 of each nationality. The signal value can be measured correctly considering the impedance of the line 6, even if the line 6 is not connected to the line transformer 14 by the photo MOS relay 15, since the receiving unit 22 measures the signal value of the both edges of the selected impedance matching element.

EMBODIMENT 3

Figure 8:
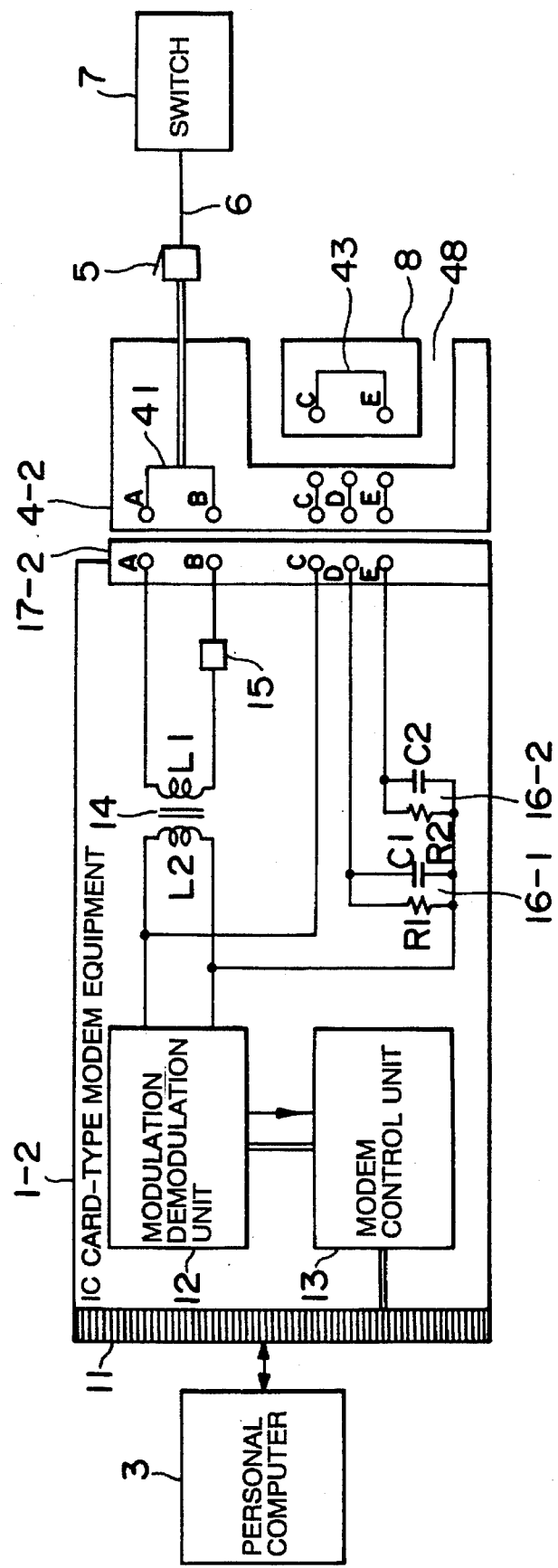
FIG. 8 is a construction diagram indicating an IC card-type modem according to the embodiment 3 of the present invention.

Then, the embodiment 3 of the present invention will be described. FIG. 8 is a construction diagram indicating an IC card-type modem according to the embodiment 3 of the present invention. The embodiment 3 can be provided with a clip 8 and a line connector 4-2.

The line connector 4-2 has a connection line 41 which connects the terminal A and the terminal B, and has terminals C, D, E corresponding to the terminals C, D, E of the connector 17-2. The clip 8 is constructed detachably in a concave unit 48 and has a connection line 43 which connects the terminal C and the terminal E. The terminals C and D within the clip 8 are connected to the terminals C and D within the line connector 4-2 detachably.

Further, other constructions are the same as those of the embodiment 2, so the detailed description about them will be omitted.

According to the above-mentioned constructions, the line connector 4-2 is installed on the connector 17-2. Besides, the impedance matching element 16-2 is selected by installing the clip 8 on the line connector 4-2.

Namely, the impedance of the line 6 side and the impedance of the modulation demodulation unit 12 can be matched, since the clip 8 whose construction is simple is provided per nationality.

EMBODIMENT 4

Figure 9:
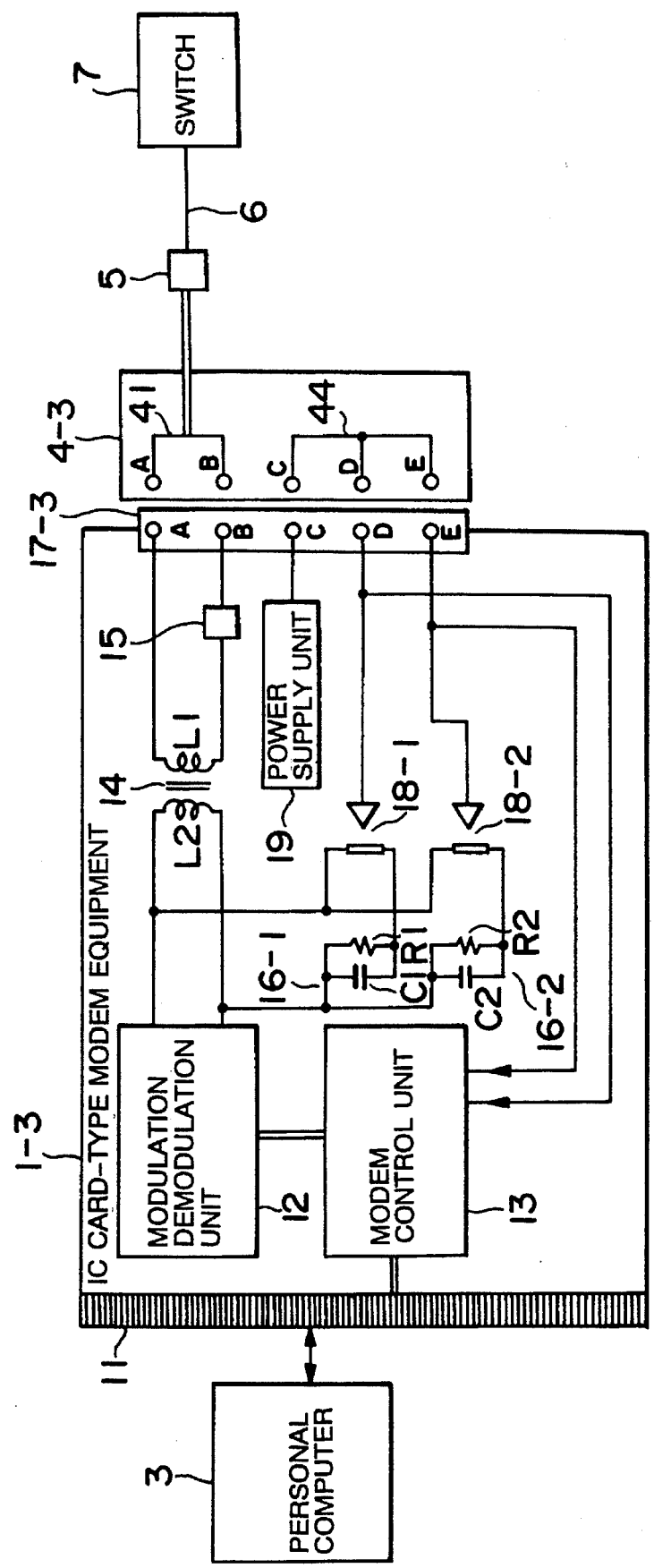
FIG. 9 is a construction diagram indicating an IC card-type modem according to the embodiment 4 of the present invention.

Then, the embodiment 4 of the present invention will be described. FIG. 9 is a diagram indicating a construction of the embodiment 4 of the present invention. In FIG. 9, the IC card-type modem equipment 1-3 comprises a power supply unit 19 connected to the terminal C of the connector 17-3, an analog switch 18-1 for connecting the input unit to the terminal D of the connector 17-3 and an analog switch 18-2 for connecting the input unit to the terminal E of the connector 17-3.

The output unit of the analog switch 18-1 is connected to the line transformer 14 and the impedance matching element 16-1. The output unit of the analog switch 18-2 is connected to the line transformer 14 and the impedance matching element 16-2.

Besides, the line connector 4-3 has a connection line 41 which connects the terminal A and the terminal B, and has a connection line 44 which connects the terminal C, the terminal D and the terminal E. Other constructions are the same as those of the embodiment 2, so the detailed description about them will be omitted.

According to the above-mentioned constructions, the terminal C, the terminal D and the terminal E of the line connector 17-3 will be connected in common, when the line connector 4-3 is installed on the connector 17-3.

Then, the analog switches 18-1 and 18-2 are activated ON, when the voltage (for instance, 5 volts) supplied from the power supply unit 19 is applied to the analog switch 18-1. Whereupon, the impedance matching elements 16-1 and 16-2 are connected to the secondary winding L2 of the line transformer 14.

As mentioned hereinbefore, the line connector 4-3 having the connection line 44 to which three terminals are connected in common is employed. Namely, the impedance of the modulation demodulation unit 12 can be matched to the impedance of the side of the line 6 by using two impedance matching elements 16-1 and 16-2.

Further, in the embodiment 4, the impedance matching was executed by using two impedance matching elements. For instance, the impedance matching also can be executed by using the line connector which selects more than three impedance matching elements.

EMBODIMENT 5

Figure 10:
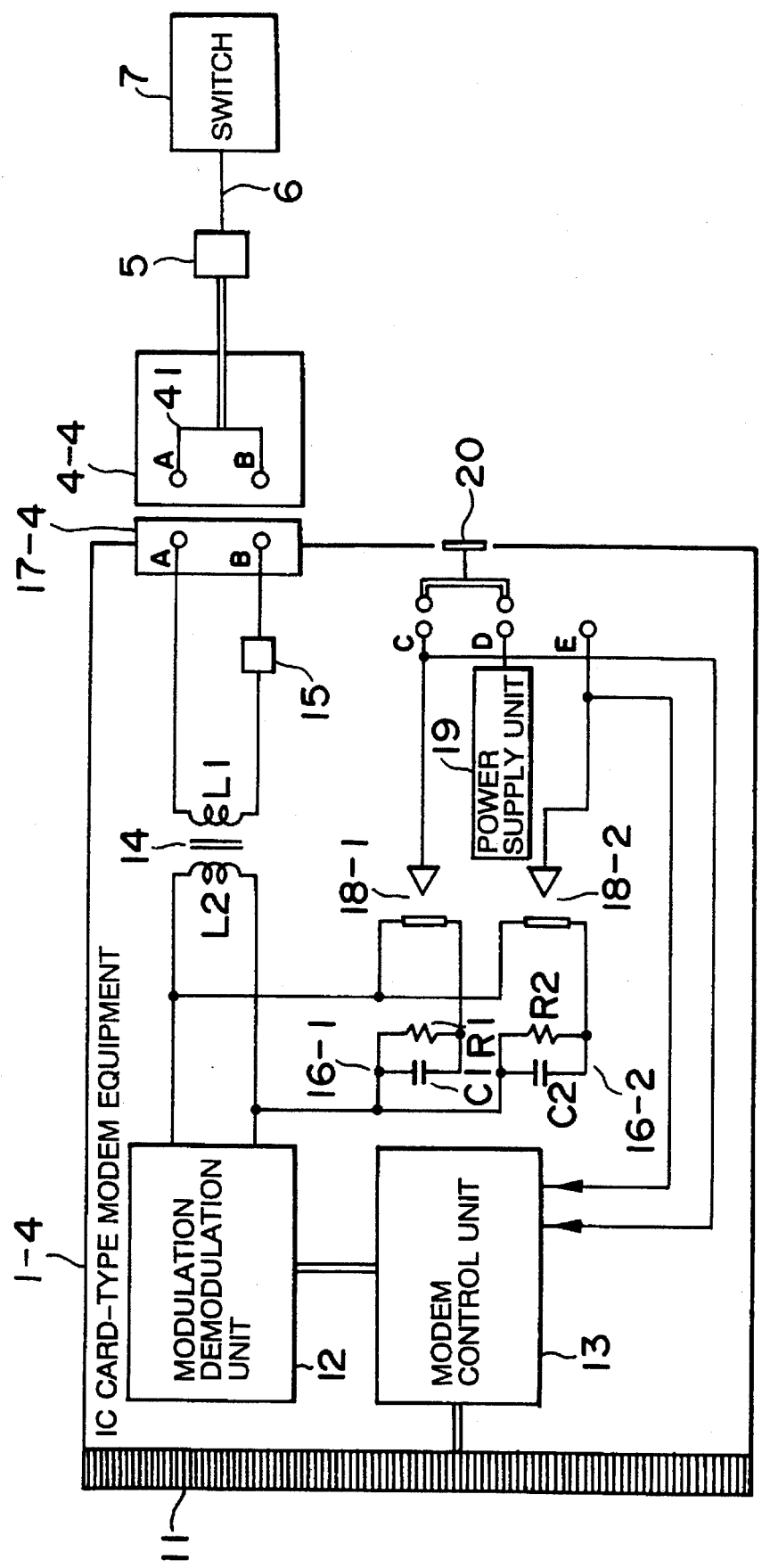
FIG. 10 is a construction diagram indicating an IC card-type modem according to the embodiment 5 of the present invention.

Then, the embodiment 5 of the present invention will be described. FIG. 10 is a diagram indicating a construction of the embodiment 5 of the present invention. In the embodiment 5, the selection matching unit is installed on the IC card-type modem equipment 1-4.

In FIG. 10, the IC card-type modem equipment 1-4 comprises a power supply unit 19 connected to the terminal D, an analog switch 18-1 which connects the input unit to the terminal C, an analog switch 18-2 which connects the input unit to the terminal E and a switch 20. The switch 20 controls the connection between the terminal C and the terminal D.

The output unit of the analog switch 18-1 is connected to the line transformer 14 and the impedance matching element 16-1. The output unit of the analog switch 18-2 is connected to the line transformer 14 and the impedance matching element 16-2.

Besides, the line connector 4—4 has the connection line 41 which connects the terminal A and the terminal B. The connector 17-4 has the terminal A and the terminal B corresponding to the line connector 4—4. Other constructions are the same as those of the embodiment 2, so the detailed description about them will be omitted.

According to the above-mentioned constructions, the terminal C and the terminal D are connected, when the switch 20 is pushed. Then, the analog switch 18-1 is activated ON, when the voltage supplied from the power supply unit 19, for instance, 5 V is applied to the analog switch 18-1. The impedance matching element 16-1 is connected to the secondary winding L2 of the line transformer 14.

As mentioned hereinbefore, the impedance of the modulation demodulation unit 12 can be matched to the impedance of the side of the line 6 corresponding to the nationality, even if the switch 20 as a selection matching unit is installed within the IC card-type modem equipment. Besides, other switch elements can be substituted for the switch 20.

What is claimed is:

1. An IC card-type modem, comprising:

modulation demodulation means, connected to terminal equipment, for modulating and demodulating data stored in the terminal equipment;

impedance conversion means for converting impedances between said modulation demodulation means and a line;

impedance matching means including a plurality of impedance matching elements which have impedances that differ from one another;

matching selection means for selecting an impedance matching element which matches the impedance of said modulation demodulation means to the impedance of the line selectively out of the plurality of impedance meaning elements, and connecting the selected impedance matching element to said impedance conversion means;

a line connector having matching selection means for detachably connecting said matching selection means to the impedance matching element to be selected and for detachably connecting the line to said impedance conversion means.

2. An IC card-type modem according to claim 1, wherein the line connector is provided per nationality.

3. An IC card-type modem according to claim 1, wherein said impedance matching means is connected to a connection of said modulation demodulation means and said impedance conversion means.

4. An IC card-type modem according to claim 3, wherein said impedance conversion means is a line transformer which includes a primary winding connected to the line and a secondary winding connected to said modulation demodulation means; and said impedance matching means is connected to the secondary winding of the line transformer.

5. An IC card-type modem according to claim 1, wherein said impedance matching means is composed of a plurality of resistance elements and a plurality of capacity elements.

6. An IC card-type modem according to claim 1, further comprising:

calculation means for calculating a value of the selected impedance matching element by measuring a signal value of both edges of the selected impedance matching element, when said matching selection means of the line connector is connected to the impedance matching element to be selected; and control means for discriminating a nationality of the line connected to the line connector on the basis of the value of the impedance matching element calculated by said calculation means, and changing an input output signal of the line into the input output signal corresponding to a specification of the discriminated nationality.

7. An IC card-type modem according to claim 6, further including:

connection control means for controlling so as to connect the line connector to said impedance conversion means, wherein said calculation means calculates the value of the selected impedance matching element, when the line connector is not connected to said impedance conversion means by said connection control means.

8. An IC card-type modem according to claim 1, wherein each of the plurality of impedance matching elements is provided per nationality so as to match the impedance of said modulation demodulation means to the impedance of the line which is specified per the nationality by using only the selected impedance matching element.

9. An IC card-type modem, comprising:

modulation demodulation means, connected to terminal equipment, for modulating and demodulating data stored in the terminal equipment;

impedance conversion means for converting impedances between said modulation demodulation means and a line;

impedance matching means including a plurality of impedance matching elements which have impedance that differ from one another;

matching selection means for selecting an impedance matching element which matches the impedance of said modulation demodulation means to the impedance of the line selectively out of the plurality of impedance matching elements, and connecting the selected impedance matching element to said impedance conversion means;

calculation means for calculating a value of the selected impedance matching element by measuring a signal value of both edges of the impedance matching element selected by said matching selection means; and control means for discriminating a nationality of the line connected to said impedance conversion means on the basis of the value of the impedance matching element calculated by said calculation means, and changing an input output signal of the line into an input output signal corresponding to a specification of discriminated nationality.

10. An IC card-type modem according to claims 9, further including:

connection control means for controlling so as to connect the line to said impedance conversion means, wherein said calculation means calculates the value of the selected impedance matching element, when the line is not connected to said impedance conversion means by said connection control means.

11. An IC card-type modem according to claim 9, wherein said impedance matching means is a connected to a connection of said modulation demodulation means and said impedance conversion means.

12. An IC card-type modem according to claim 11, wherein said impedance conversion means is a line transformer which includes a primary winding connected to the line and a secondary winding connected to said modulation demodulation means; and said impedance matching means is connected to said secondary winding of the line transformer.

13. An IC card-type modem according to claim 12, wherein said impedance matching means is composed of a plurality of resistance elements and a plurality of capacitance elements.

14. A method for communicating data by an IC card-type modem, comprising the steps of:

modulating and demodulating data stored in terminal equipment by a modulation demodulation unit;

converting impedances between said modulation demodulation unit and a line;

selecting one of a plurality of impedance matching elements having impedances which differ from one another selectively; and matching the impedance of said modulation and demodulation unit to the impedance of the line by the selected impedance matching element;

calculating a value of the selected impedance matching element by measuring a signal value of both edges of the selected impedance matching element;

discriminating a nationality of the line on the basis of the value of the calculated impedance matching element; and changing an input output signal of the line into an input output signal corresponding to a specification of a discriminated nationality.

15. A method for communicating data by an IC card-type modem according to claim 14, wherein said calculation step further calculates the value of the selected impedance matching element, when a side of the line is opened.

16. A method of communicating data by an IC card-type modem according to claim 14, wherein each of the plurality of impedance matching elements is provided per nationality so as to match the impedance of said modulation demodulation unit to the impedance of the line which is specified per nationality by using only the selected impedance matching element.

* * * * *